US012736924B2

(12) United States Patent
Amano

(10) Patent No.: US 12,736,924 B2
(45) Date of Patent: Sep. 15, 2026

(54) EXTERIOR MEMBER, ELECTRONIC TIMEPIECE, AND EXTERIOR MEMBER MANUFACTURING METHOD

(71) Applicant: CASIO COMPUTER CO., LTD., Tokyo (JP)

(72) Inventor: Masao Amano, Uenohara (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 382 days.

(21) Appl. No.: 18/446,080

(22) Filed: Aug. 8, 2023

(65) Prior Publication Data

US 2024/0053710 A1 Feb. 15, 2024

(30) Foreign Application Priority Data

Aug. 9, 2022 (JP) ................................ 2022-126728

(51) Int. Cl.
*G04B 37/22* (2006.01)
*G04G 17/08* (2006.01)

(52) U.S. Cl.
CPC ............ *G04G 17/08* (2013.01); *G04B 37/22* (2013.01)

(58) Field of Classification Search
None
See application file for complete search history.

(56) References Cited

U.S. PATENT DOCUMENTS

2017/0067137 A1* 3/2017 Kawasaki .............. G04B 37/22
2019/0061003 A1* 2/2019 Itotsubo .................. C22C 14/00
2019/0323114 A1* 10/2019 Sato .......................... C23C 8/10

FOREIGN PATENT DOCUMENTS

JP H04120206 A 4/1992
JP H10259487 A 9/1998
JP 2010162545 A 7/2010
JP 2018-75059 A 5/2018
WO 2012059990 A1 5/2012
WO 2018128160 A1 7/2018

OTHER PUBLICATIONS

Notice of Reasons for Refusal dated Jul. 2, 2024 received in Japanese Patent Application No. 2022-126728.
Japanese Notice of Reasons for Refusal dated Mar. 3, 2026 received in Japanese Patent Application No. 2024-192729.

* cited by examiner

*Primary Examiner* — Kim S. Horger
(74) *Attorney, Agent, or Firm* — Scully, Scott, Murphy & Presser, P.C.

(57) ABSTRACT

An exterior member includes constituent materials different from one another in crystal grain size. The exterior member has a surface segmented into regions formed of the respective constituent materials.

10 Claims, 4 Drawing Sheets

EXTERIOR MEMBER, ELECTRONIC TIMEPIECE, AND EXTERIOR MEMBER MANUFACTURING METHOD

REFERENCE TO RELATED APPLICATIONS

This application is based upon and claims the benefit of priority from the prior Japanese Patent Application No. 2022-126728, filed on Aug. 9, 2022, the entire contents of which are incorporated herein by reference.

TECHNICAL FIELD

The present disclosure relates to an exterior member, an electronic timepiece, and an exterior member manufacturing method.

DESCRIPTION OF RELATED ART

Portable electronic devices are required to have, with their exterior members, both functionality and design in the range of sizes and shapes suitable for the electronic devices to be carried around. As a material capable of providing a sense of luxury, a titanium material, such as titanium or a titanium alloy, has been used. However, there are titanium materials having low surface hardness. If such a material is used for an exterior member, it is scratched or reduces its luster as used, thus being prone to deteriorate with time.

As a technique for hardening the surface of a titanium material without degrading its properties in design, there is disclosed in WO 2018/128160 A1 a technique of forming a hardened layer on the surface of a titanium material, the hardened layer being formed by diffusion and dissolving of oxygen or oxygen and nitrogen, and making the outermost titanium oxide layer sufficiently thin, thus suppressing occurrence of interference fringes, turbidity and so forth.

SUMMARY OF THE INVENTION

According to an aspect of the present disclosure, there is provided an exterior member including constituent materials different from one another in crystal grain size, wherein the exterior member has a surface segmented into regions formed of the respective constituent materials.

BRIEF DESCRIPTION OF DRAWINGS

The accompanying drawings are not intended as a definition of the limits of the present disclosure but illustrate embodiments of the present disclosure, and together with the general description given above and the detailed description of embodiments given below, serve to explain the principles of the present disclosure, wherein.

DETAILED DESCRIPTION

Hereinafter, one or more embodiments of the present disclosure will be described with reference to the drawings.

Figure 1:
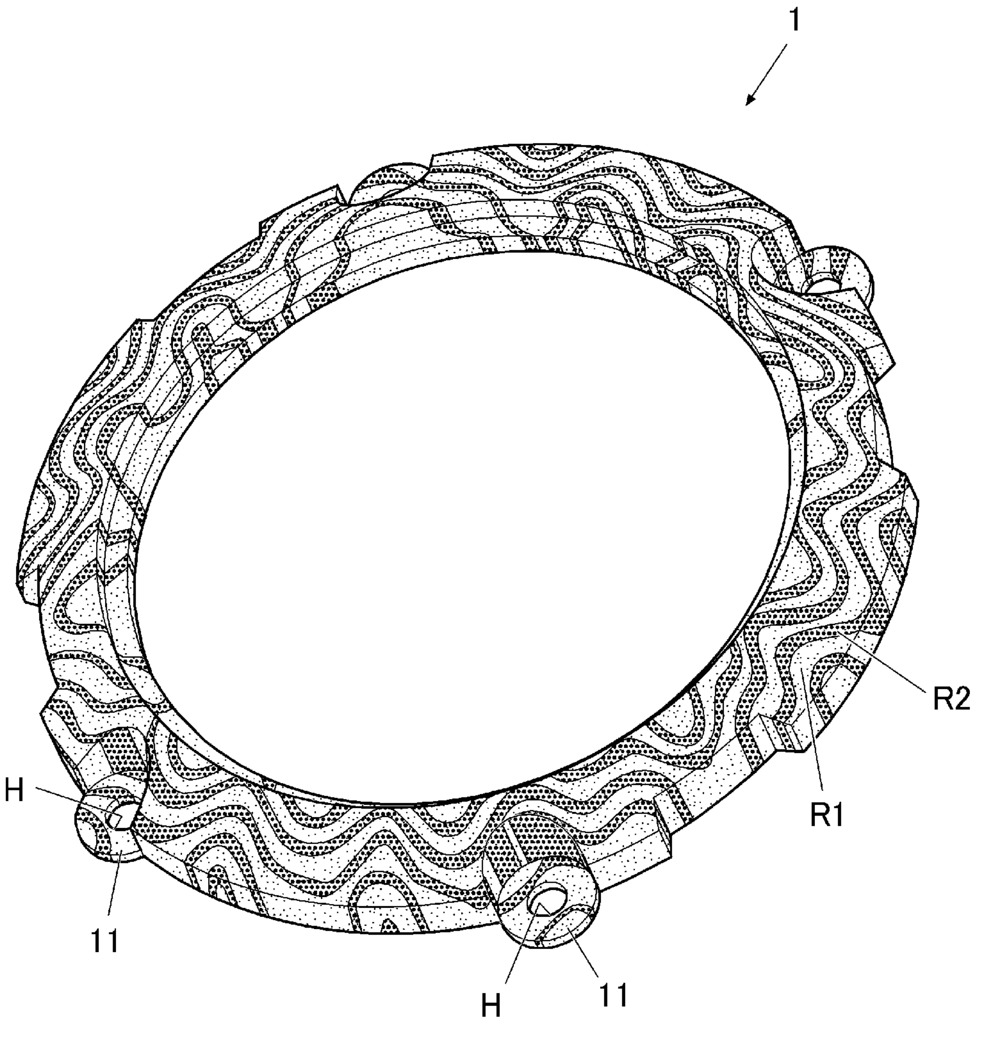
FIG. 1 is an overall perspective view of an example of an exterior member of an embodiment(s)

FIG. 1 is an overall perspective view of an example of an exterior member 1 of an embodiment(s).

The exterior member 1 is a member (bezel) attached to and along the circumferential edge of the upper surface or the lateral surface of an electronic timepiece (e.g., electronic watch) and having a substantially annular shape.

The upper surface of the exterior member 1 is uneven for its design and functions. In plan view, the exterior member 1 has, at its outer edge, recesses and projections in the width direction, which is perpendicular to the circumferential direction of the exterior member 1. At least one of the recesses at the outer edge corresponds to, for example, a plan-view position of a pushbutton switch disposed on the lateral surface of the electronic watch. At some of the projections at the outer edge, recesses 11 depressed in the height direction are provided. The recesses 11 have holes H for screwing. The upper surface of the exterior member 1 has at least a portion shaped to be inclined from the inner side to the outer side. In this embodiment, the upper surface of the exterior member 1 indicates a surface visible in plan view from above the display surface of an electronic timepiece in a state in which the exterior member 1 is attached to the electronic timepiece, and therefore is not limited to a single plane.

The exterior member 1 has, on the upper surface, regions that are different in visibility. The (types of) regions are, for example, a first region(s) R1 and a second region(s) R2. The first region R1 is a region with low surface roughness and high flatness. Hence, light tends to be specularly reflected in the first region R1. The second region R2 is a matte surface (region) with higher surface roughness than the first region R1. Hence, light is more diffusely reflected in the second region R2 than in the first region R1.

The first region R1 and the second region R2 are clearly demarcated. In this embodiment, the boundary between a first region R1 and a second region R2 has a curved portion(s). For example, this boundary extends substantially annularly/circularly along the circumferential direction of the exterior member 1 while waving in the width direction, which is perpendicular to the circumferential direction, thus having a wavy portion(s). The curved portions may include a (curved) portion that is formed of very short, straight lines connected to one another at an angle(s) but can be visually recognized (seen) by a user as a curve. There may be two or more boundaries in the abovementioned width direction. Some boundaries may be cut in part by reaching the outer edge or the inner edge of the exterior member 1, depending on their waviness and the width of the exterior member 1. One boundary may branch into two or more, or two or more boundaries may join. That is, the second regions R2 may include an isolated region (second region R2) enclosed by a first region(s) R1. The waviness does not need be regular. The waviness may be predetermined to be suitable for a desired design. There is no clear difference in the height direction (i.e., no step) between the first region(s) R1 and the second region(s) R2.

The constituent material of the first region R1 is different from that of the second region R2. The constituent material of the first region R1 is, for example, 64 titanium alloy (Ti-6Al-4V) (first constituent material or first metal material) that is a titanium alloy containing 6% aluminum and 4% vanadium in mass ratio. The constituent material of the second region R2 is, for example, pure titanium (second constituent material or second metal material). Crystals grow larger and have a larger crystal grain size in the second region R2 than in the first region R1. That is, the constituent materials of the first region R1 and the second region R2 are different from one another in crystal grain size. The surface roughness of the second region R2 is therefore higher/larger than that of the first region R1. As a result, there is a difference in visibility between the first region R1 and the second region R2.

Next, a manufacturing method of the exterior member 1 of this embodiment will be described.

In order to manufacture/produce the exterior member 1, one of the first region R1 and the second region R2 is formed first, and the other one is additionally formed thereafter. For example, the first region R1 is formed first, and the second region R2 is additionally formed thereafter. Then, the first region R1 and the second region R2 are heated together to grow crystals.

Regarding the crystal growth, the transformation temperature of 64 titanium alloy is higher than that of pure titanium. That is, 64 titanium alloy and pure titanium are different from one another in transformation temperature. If pure titanium and 64 titanium alloy are heated at a temperature between their transformation temperatures, their crystal growth rates are significantly different from one another. That is, crystals grow significantly in the second region R2, which is formed of pure titanium, as compared with in the first region R1. The surface roughness therefore selectively increases in the second region R2.

Figure 2:
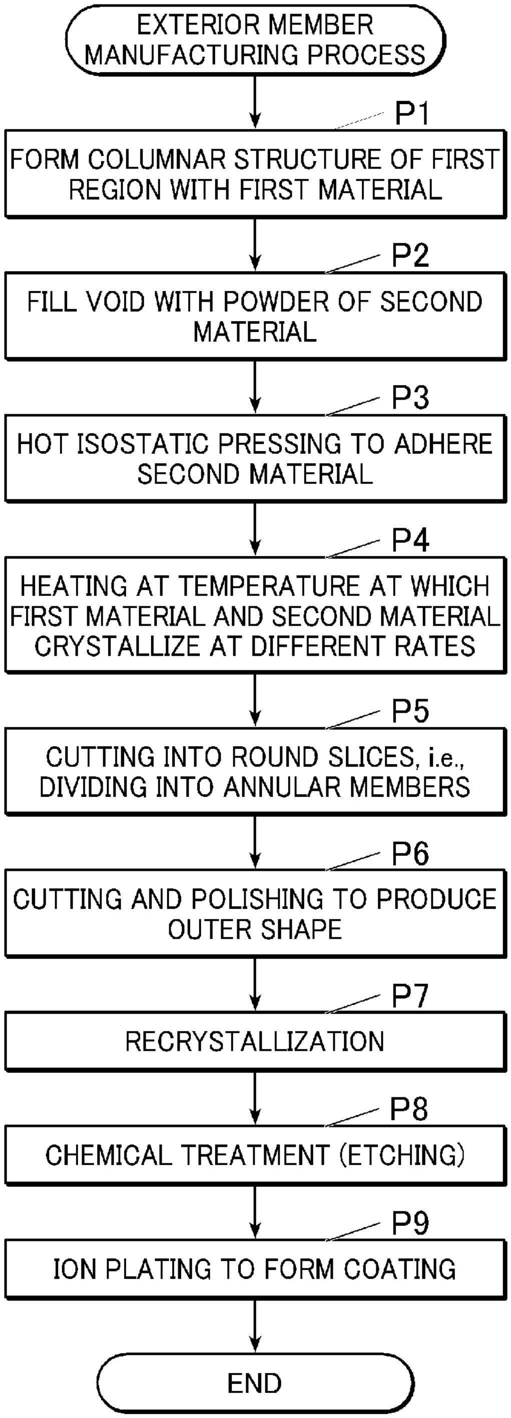
FIG. 2 is a flowchart of a manufacturing process of the exterior member.

FIG. 2 shows a flowchart of a manufacturing process of the exterior member 1.

FIG. 3A to FIG. 4B are cross-sectional perspective views schematically showing states in the manufacturing process. For convenience of explanation, a section of about ¼ of a structure having a thickness for one exterior member 1 is shown.

Figures 3A, 3B, 3C:
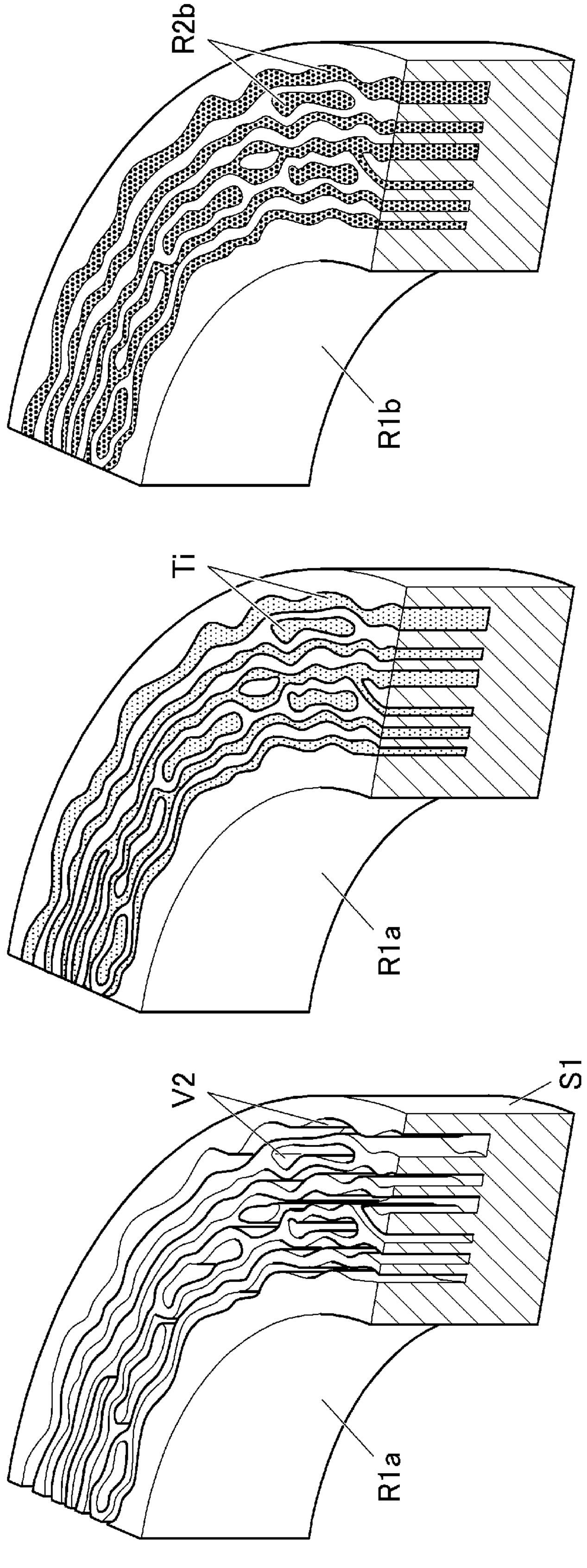
FIG. 3A is a cross-sectional perspective view schematically showing a state in the manufacturing process.
FIG. 3B is a cross-sectional perspective view schematically showing a state in the manufacturing process.
FIG. 3C is a cross-sectional perspective view schematically showing a state in the manufacturing process.

In Step P1, pure titanium powder and 64 titanium alloy powder are prepared, and a cylindrical structure S1 including a columnar portion(s) R1*a* (columnar structure(s)) in the first region(s) R1 as viewed in plan view is formed with 64 titanium alloy powder by using a three-dimensional (3D) printer. Each powder mentioned above is constituted of particles (powder particles). The size of powder particles of each powder is not particularly limited as far as it is suitable for processing/treatment. As shown in FIG. 3A, in the formed cylindrical structure S1, the columnar portion R1*a* extends in the vertical direction. The second region R2 as viewed in plan view is a hole-like gap(s) V2 (void(s)) that remains in (between) the columnar portion(s) R1*a*. This cylindrical structure S1 is, in practice, sufficiently longer/greater in the height direction than one exterior member 1, and is later cut at regular space intervals in the height direction into round slices and these round slices (annular members) are each shaped by cutting so that two or more exterior members 1 are produced. The cylindrical structure S1 may be formed by forming and stacking two or more identical annular structures (annular members) each having a thickness of one round slice mentioned above.

In Step P2, as shown in FIG. 3B, in the second region R2 as viewed in plan view, the gap V2 is filled with pure titanium (Ti) powder. In Step P3, the cylindrical structure S1 filled with pure titanium powder is pressurized and heated by hot isostatic pressing (HIP). This process unites (binds) particles of pure titanium powder and adheres same to the cylindrical structure S1. At the time, the cylindrical structure S1 as a whole shrinks and becomes smaller than earlier according to gaps or the like having existed between the particles of pure titanium powder. For this reason, the size of the cylindrical structure S1 that is formed in Step P1 is predetermined to be larger than the size of the finished exterior member 1 by the amount of shrinkage, and the filling amount of pure titanium powder is also predetermined. The apparatus that performs HIP may be a well-known apparatus.

In Step P4, the cylindrical structure S1, in which 64 titanium alloy and pure titanium in the demarcated regions are adhered to one another, is heated at a predetermined temperature. As the heating temperature for this heating, a temperature between the transformation temperature of pure titanium and the transformation temperature of 64 titanium alloy is predetermined, which causes crystal growth of pure titanium, the transformation temperature of which is lower than the heating temperature, to progress faster (at a higher crystal growth rate) than that of 64 titanium alloy, the transformation temperature of which is higher than the heating temperature. Hence, as shown in FIG. 3C, a region(s) R2*b* of pure titanium is matte, where diffuse reflection is likely to occur. Crystal growth of 64 titanium alloy is slower than that of pure titanium. Therefore, in a state in which the crystal grain size of pure titanium is an appropriate size, the crystal grain size of 64 titanium alloy is smaller than that of pure titanium. Changing and setting the heating temperature within the above range changes the magnitude of difference between the crystal growth rates of the two materials as appropriate. For this reason, the heating temperature may be predetermined on the basis of a desired light reflection state in a region(s) Rb1 of 64 titanium alloy and a desired magnitude of difference between the light reflection states of the region R1*b* of 64 titanium alloy and the region R2*b* of pure titanium.

In Step P5, the cylindrical structure S1, in which the region R1*b* of 64 titanium alloy and the region R2*b* of pure titanium have been formed, is cut at regular space intervals in the height direction into round slices, so that two or more annular members are produced. The space interval(s), at which the cylindrical structure S1 is cut into round slices, namely, the height (thickness) of each annular member, is slightly greater than the height of one exterior member 1.

Figure 4A:
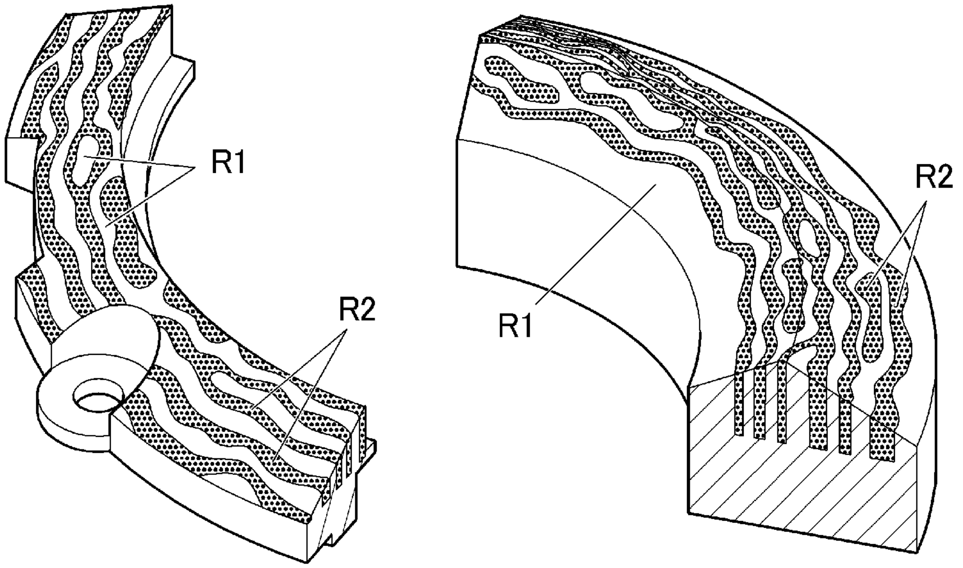
FIG. 4A is a cross-sectional perspective view schematically showing a state in the manufacturing process.

In Step P6, each annular member is cut and polished so as to have the outer shape of an exterior member. As shown in FIG. 4A, the pattern depicted with 64 titanium alloy of the columnar region R1*b* and pure titanium of the region R2*b* is kept in plan view even after the cutting, and the first region R1 and the second region R2 appear on the upper surface of the exterior member. Depending on the positional relationship between the region R1*b* and the region R2*b* and the outer shape of the exterior member, the pattern depicted therewith may be exposed (appear) on the lateral surface of the exterior member as well; to be more specific, on the inner edge side or inner circumferential surface and/or the outer edge side or outer circumferential surface of the annular exterior member.

In Step P7, the surface roughened by the processes in Steps P5, P6 and the like is heated to an appropriate temperature, so that each component recrystallizes.

In Step P8, the surface of the exterior member after recrystallization in Step P7 is chemically treated (etched) to be dissolved. This treatment causes a crystalline pattern of the surface of the exterior member to emerge (stand out).

Figure 4B:
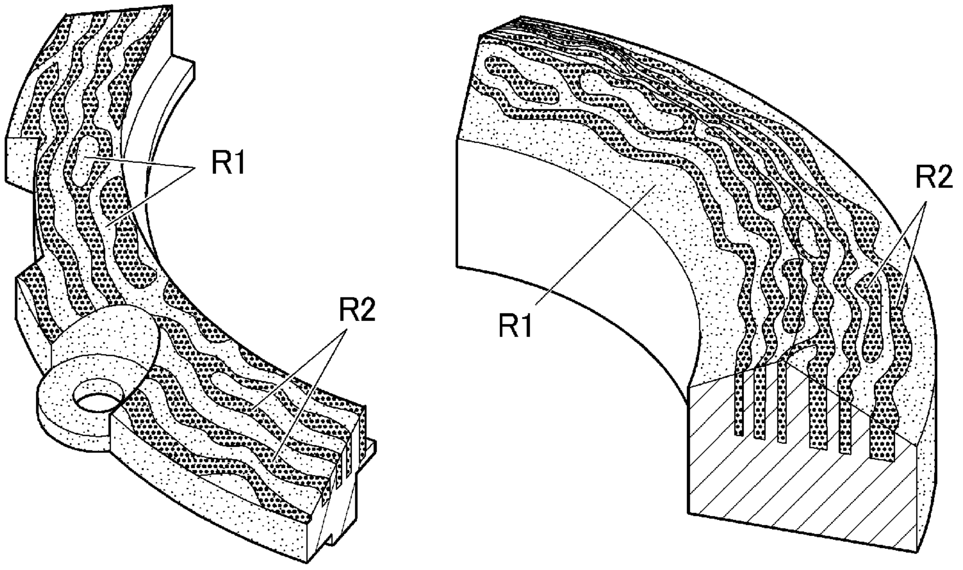
FIG. 4B is a cross-sectional perspective view schematically showing a state in the manufacturing process.

In Step P9, the surface is coated and protected with a coating (hardened coating) formed by ion plating (IP). This coating is a titanium-based coating. As shown in FIG. 4B, the coating is formed so thin that the first region R1 and the second region R2 are visible through the coating. As IP, a well-known technique, such as arc ion plating (AIP), may be used. In the manner described so far, the exterior member 1 is produced. The exterior member 1 is fixed to the body of an electronic timepiece with screws passing through the holes H.

As described above, the exterior member 1 of this embodiment has a surface segmented into regions (first region R1 and second region R2) formed of constituent materials that are different from one another in crystal grain size. In the case of a conventional technique, the surface of an exterior member is monotonous/simple and lacks variety. In contrast, the exterior member 1 of this embodiment has a patterned surface with the constituent materials exposed in the regions into which the surface is segmented. Thus, the exterior member 1 can have a varied surface while maintaining its functionality, which can expand the range of designs for the exterior member 1 and accordingly for the electronic timepiece to which the exterior member 1 is attached.

The constituent materials may consist of metal materials. That is, the regions of the surface of the exterior member 1 may be formed of only metal materials that are different from one another in crystal grain size.

Further, the boundary between the regions may include a curved portion(s), which can further expand the range of designs for the exterior member 1. In particular, the exterior member 1 having a design of a high artistic quality can be produced. Thus, a sense of luxury or the like can be easily added to the exterior member 1.

Further, the exterior member 1 has an annular shape. The boundary may extend along the circumferential direction of the annular shape, and the curved portion of the boundary may include a wavy portion(s). Such boundary can easily put a cyclic/periodic design on the exterior member 1. Thus, the exterior member 1 can have a pattern fit for an annular structure.

Further, of the regions, the first region R1 may be a region of a first metal material, and the second region R2, which is different from the first region R1, may be a region of a second metal material that is different from the first metal material. Thus, in a gap(s) (second region R2) in a structure portion (first region R1) of a metal material, another metal material is put, and adhered thereto. Therefore, the exterior member 1 can be clearly patterned with the second metal material to the portion of the first metal material.

Further, the first metal material may be Ti-6Al-4V, and the second metal material may be pure titanium. Combination of two types of materials that are similar to one another in properties except transformation temperature makes it easy to form the exterior member 1 without impairing functionality thereof. Further, this combination is unlikely to put a garish design on the exterior member 1.

Further, the exterior member 1 may have, on the regions, a coating having a thickness with which the regions are visible through the coating. Titanium or the like is prone to damage and deteriorate with time. The exterior member 1 having such a coating can stably keep its pattern and functionality over a longer period of time.

Further, an electronic timepiece has the exterior member 1 as a bezel. Since the pattern of the exterior member 1 is varied, an atmosphere to be given to the electronic timepiece can be varied. Further, a sense of luxury or the like can be added to an electronic timepiece with the exterior member 1 only.

Further, the manufacturing method of the exterior member 1 of this embodiment includes: forming the columnar portion R1*a* with a first constituent material, the columnar portion R1*a* being in the shape of the first region R1 as viewed from above and extending in the vertical direction; filling the gap V2 in the columnar portion R2 with powder particles or the like of a second constituent material that is different in transformation temperature from the first constituent material, the gap V2 being in the shape of the second region R2 as viewed from above; binding the powder particles of the second constituent material and adhering the second constituent material to the columnar portion R1*a* by HIP; and heating the columnar portion R1*a* with the gap V2 filled with the powder particles of the second constituent material at a temperature between the transformation temperature of the first constituent material and the transformation temperature of the second constituent material to grow crystals of the first constituent material and the second constituent material at different crystal growth rates. Thus, the manufacturing method of the exterior member 1 of this embodiment grows crystals of two types of materials under the condition at which crystal growth rates of the materials are different from one another, so that, in the end, portions where crystal grain sizes are different coexist in the exterior member 1. The portion with a higher crystal growth rate is selectively transformed to be matte. According to this manufacturing method, the processes after production of the columnar portion R1*a* can be easily performed, which can expand the range of designs for the exterior member 1. Further, since the pattern on the surface is depicted with the difference in reflective state, the pattern of the exterior member 1 is unlikely to be garish. Thus, the exterior member 1 does not assert its presence too much against the display screen of an electronic timepiece.

Further, the columnar portion R1*a* may be formed by using a 3D printer, which makes it possible to form the first region R1 with high precision even if the first region R1 is an intricate one. Hence, the exterior member 1 can have a minute and elaborate pattern. It has been especially difficult to mass-produce, as designed, curved boundaries between regions that are different from one another in surface characteristics, much less to expose and use as a pattern such boundaries on the upper surface that is not a single plane. The manufacturing method of the exterior member 1 of this embodiment uses a 3D printer, which makes it possible to expose a pattern with curved boundaries on the upper surface.

Further, the manufacturing method of the exterior member 1 may include forming a coating on the first region R1 and the second region R2 by ion plating, the coating having a thickness with which the first region R1 and the second region R2 are visible through the coating. This coating can protect the surface of the exterior member 1 and suppress deterioration and damage with time while maintaining design visibility.

The present disclosure is not limited to the above embodiment and can be modified in a variety of respects.

For example, in the above embodiment, pure titanium and 64 titanium alloy are used in combination as two types of constituent materials, but this is not a limitation. The constituent materials can be any materials as far as they have properties suitable for the abovementioned processing/treatment. Examples of such constituent materials include COBARION®, stainless steel (SUS), and zirconium. COBARION is a material the crystal growth of which hardly progresses by heating (Step P4) and that is hardly dissolved by etching (Step P8). Hence, a region of COBARION is more specular than a region of 64 titanium alloy, namely, has a higher degree of specular reflection. Combination of COBARION and a constituent material the crystal growth of which progresses provides greater and clearer contrast between the above-described two regions than the combination of pure titanium and 64 titanium alloy.

Further, in the above embodiment, HIP is performed on the cylindrical structure S1, in which the void in the columnar structure of 64 titanium alloy is filled with pure titanium powder, but the materials may be reversed. That is, the void in the columnar structure of pure titanium may be filled with 64 titanium alloy powder.

Further, in the above embodiment, the minute material(s) with which the void is filled is powder, namely, powder particles, but the material may be constituted of grains that are larger than powder particles as far as the size thereof is suitable for the abovementioned binding and adhering by HIP.

Further, the boundary between the first region R1 and the second region R2 in the exterior member 1 may not be mostly wavy along the circumferential direction of the annular exterior member 1. For example, the boundary may have a straight portion(s) and/or a sharply bent portion(s). Further, the exterior member 1 may mainly have boundaries of closed shapes. Examples thereof include a round boundary, an oval boundary, and a square boundary.

Further, in the above embodiment, the upper surface of the exterior member 1 is formed of two types of materials in combination for two types of regions, but may be formed of three or more types of materials in combination. In this case, if the voids are separate from one another and constituent materials do not contact one another when they are put in the voids, the voids may be filled with powders or the like of the respective constituent materials, which are different from one another, so that an exterior member can be manufactured in the same manner as the exterior member 1 having the above-described two types of regions. As a result, an exterior member 1 having two or more types of second regions where crystal grain sizes are different due to two or more second constituent materials is produced.

Further, the columnar portion R1*a* may not be formed by using a 3D printer.

Further, the coating may be formed by a method other than IP. If durable materials are used for the exterior member 1, no coating may be formed. Further, the coating may not be completely transparent if it is optically transparent and the first region R1 and the second region R2 are visible through the coating. That is, the upper surface may be slightly colored by the coating.

Further, the electronic timepiece to which the exterior member 1 is attached is not limited in type. That is, the electronic timepiece may or may not have a digital display, a handle-type display, any of various functions, and/or the like. Further, the distal display is not limited in type of its display screen, the number of colors to be displayed, the number of pixels, size, and so forth, and the handle-type display is not limited in the number of handles, positions of the handles, the number of motors that rotate the hands, designs of the handle, and so forth. Further, the electronic timepiece may be a multifunctional terminal, such as a smartwatch. The exterior member 1 may be attached to not an electronic timepiece but another portable electronic device.

The configuration, structures, manufacturing method and so forth described in detail in the above embodiment can be appropriately changed without departing from the scope of the present disclosure.

Although one or more embodiments of the present disclosure have been described above, the scope of the present disclosure is not limited to the embodiments but includes the scope of claims below and the scope of their equivalents.

The invention claimed is:

1. An exterior member comprising constituent materials different from one another in crystal grain size, wherein the exterior member has a surface segmented into regions formed of the respective constituent materials, wherein the regions include a first region and a second region different from one another, and the constituent materials include a first metal material and a second metal material different from one another in transformation temperature, and wherein the first region is formed of the first metal material, and the second region is formed of the second metal material.

2. The exterior member according to claim 1, wherein the exterior member consists of metal materials different from one another in crystal grain size.

3. The exterior member according to claim 1, wherein a boundary between the regions includes a curved portion.

4. The exterior member according to claim 3, wherein the exterior member has an annular shape, and wherein the boundary extends along a circumferential direction of the annular shape, and the curved portion of the boundary includes a wavy portion.

5. The exterior member according to claim 1, wherein the first metal material is Ti-6Al-4V, and the second metal material is pure titanium.

6. The exterior member according to claim 1, further comprising, on the regions, a coating through which the regions are visible.

7. An electronic timepiece comprising the exterior member according to claim 1 as a bezel.

8. An exterior member manufacturing method comprising:

in a first region as viewed from above, forming a columnar structure with a first constituent material, the columnar structure extending in a vertical direction;

in a second region that is a void portion in the columnar structure as viewed from above, filling the void portion with powder particles of a second constituent material that is different in transformation temperature from the first constituent material;

binding the powder particles of the second constituent material and adhering the second constituent material to the columnar structure by hot isostatic pressing; and heating the columnar structure with the void portion filled with the powder particles of the second constituent material at a temperature between the transformation temperature of the first constituent material and the transformation temperature of the second constituent material to grow crystals of the first constituent material and the second constituent material at different crystal growth rates.

9. The exterior member manufacturing method according to claim 8, wherein the forming includes forming the columnar structure using a three-dimensional printer.

10. The exterior member manufacturing method according to claim 8, further comprising forming a coating on the first region and the second region by ion plating, the coating having a thickness with which the first region and the second region are visible through the coating.

* * * * *